3,674,531
Patented July 4, 1972

3,674,531
SYNTHETIC POLYESTER FILM ASSEMBLIES
Basil Robert Shephard, Margaret Loudon Clachan, and David Rankine Kennedy, Manningtree, Essex, and Terence Arnold Abbott, Norwich, England, assignors to Bexford Limited, Manningtree, England
No Drawing. Continuation of abandoned application Ser. No. 809,377, Mar. 21, 1969. This application June 1, 1971, Ser. No. 148,974
Claims priority, application Great Britain, Mar. 25, 1968, 14,283/68
Int. Cl. G03c 1/80
U.S. Cl. 117—7                                25 Claims

ABSTRACT OF THE DISCLOSURE

A film assembly suitable for use as a base for photographic film comprises synthetic linear polyester film base carrying a layer of a copolymer of a vinyl halogeno ester such as vinyl chloroacetate with at least one other monomer copolymerisable therewith, the said monomer and at least one of said monomers being selected so that the final copolymer has a softening point lower than that of the product obtained by polymerisation in the absence of the said selected monomer or monomers.

---

This is a continuation of S.N. 809,377, filed Mar. 21, 1969, now abandoned.

This invention relates to film assemblies and is an improvement in or modification of the invention claimed and described in United States patent application No. 511,980, now Pat. No. 3,506,445.

In specification No. 511,980 and in our copending application 658,646 there is described a film assembly which comprises a synthetic linear polyester film base carrying a layer of a homopolymer of vinyl halogeno-ester, or a copolymer of a vinyl halogeno-ester with either vinyl acetate and/or vinyl alcohol, an unsaturated carboxylic acid, acrylamide or N-methylol acrylamide, which layer is applied to the polyester support either before that support is fully orientated or after the support is fully orientated.

The film assembly so provided is suitable for further coating with a sub layer of gelatin followed by a gelatino silver halide emulsion to give a light sensitive photographic film product. Alternatively, the film base so provided may be further coated with a layer of a cellulose acetate, cellulose acetate butyrate, a polyvinyl acetate, a partially hydrolysed polyvinyl acetate or a polyvinyl acetal, which layer carries at its surface light sensitive diazonium salts, to yield a light sensitive diazo-type film product.

In these light sensitive film products, the layer of vinyl halogeno-ester polymer provides excellent adhesion between the synthetic linear polyester support and the light sensitive layer. However, in practice it has been found that there was some difficulty in obtaining vinyl halogeno-ester polymer coatings of sufficient uniformity to avoid considerable effects on the properties of the silver halide or diazo-type film products.

It is an object of the present invention to provide in a film assembly of the type indicated, a polyvinyl halogeno-ester polymer layer with improved uniformity and with excellent adhesion to the synthetic linear polyester support and to subsequently applied polymer layers.

According to the present invention, therefore, there is provided a film assembly which comprises a synthetic linear polyester film base carrying on at least one surface a layer, herein after referred to as layer A, of a copolymer of a vinyl halogeno-ester with at least one other monomer copolymerisable therewith, the said monomer or at least one of the said other monomers being selected so that the final copolymer has a softening point lower than that of the product obtained by polymerisation in the absence of the said selected monomer or monomers.

Methods of determining softening points of polymer vary in the absolute values given. It is accordingly to be understood that in referring to relative softening points, it is implied that the same method is used for determining the values to be compared.

The copolymers of the present invention may be copolymers of a vinyl halogeno-ester with one or more of the following monomers listed in Table I which have a softening point lowering effect: these monomers have an internal plasticising effect and include alkyl acrylates, alkyl methacrylates, polyalkylene oxide itaconates and maleates, vinyl alkyl ethers, vinyl esters, alkenes, alkadienes and alkyl styrenes.

TABLE I n-Butyl acrylate
2-ethoxyethyl acrylate
Ethyl acrylate
2-ethylhexyl acrylate
Decyl methacrylate
Octa decyl methacrylate
2-ethylhexyl methacrylate
Di-(polypropyleneoxy) itaconate
Vinyl butyl ether
Vinyl ethyl ether
Vinyl methyl ether
Vinyl isobutyl ether
Vinyl stearate
Vinyl versatate
Ethylene
1-butene
Butadiene
4-dodecyl styrene
4-nonyl styrene The copolymers of the present invention may be copolymers of a vinyl halogeno-ester with one or more of the above specified monomers having a softening point lowering effect, optionally together with one or more further monomers which yield in the final copolymer carboxyl, hydroxyl, ester, nitrile, amide, N-mono or N,N-disubstituted amine, amino or substituted amino groupings. Suitable such further monomers are listed in Table II:

TABLE II

Itaconic acid
Maleic acid
Citraconic acid
Acrylic acid
Methacrylic acid
Crotonic acid
Di-esters and mono-esters of unsaturated di-carboxylic acids with monohydric or polyhydric alcohols
Allyl alcohol
Vinyl alcohol Esters of unsaturated mono-carboxylic acids with polyhydric alcohols, e.g. 2-hydroxyethyl methacrylate
Vinyl acetate
Acrylonitrile
Acrylamide
Methacrylamide
N-(1,1-dimethyl-3-oxobutyl)acrylamide
N-mono or N,N-di-substituted derivatives of unsaturated amides, e.g. tertiary butyl acrylamide, N,N-dimethyl acrylamide, N-methylol acrylamide
N-methoxy methyl acrylamide, N-acetoxy methyl acrylamide
N-vinyl pyrrolidone
Dimethyl-amino-ethyl methacrylate It is to be noted that in this specification, the term "monomer" is used to indicate the units present in the copolymer and not necessarily to indicate the monomers from which the copolymer was obtained, i.e. in some instances the coated polymer may be obtained by chemical modification of a pre-formed copolymer thus producing a copolymer not all of the units of which are the same as the monomers from which the pre-formed copolymer was prepared.

The homopolymers from the monomers exemplified in Table I usually have a softening point less than 0° C., and small proportions of the monomers of Table I copolymerised with vinyl halogeno-esters (and optionally monomers of Table II) lower the softening point of the polymer product. This is illustrated in the table below in which are recorded glass transition temperatures (Tg) determined by a differential calorimetric method.

Polymer composition: Tg, ° C.
A copolymer from 90 mole percent vinyl monochloroacetate and 10 mole percent acrylamide _____ 51
A terpolymer from 80 mole percent vinyl monochloroacetate, 10 mole percent acrylamide and 10 mole percent ethyl acrylate _____ 40
A copolymer comprising 72 mole percent vinyl monochloroacetate and 28 mole percent polyvinyl alcohol _____ 43
A terpolymer comprising 40 mole percent vinyl monochloroacetate, 17 mole percent vinyl alcohol and 43 mole percent ethylene _____ 21

Examples of suitable proportions of monomer units present in the copolymer of the present invention are:

Vinyl halogeno-ester (hereinafter referred to as component I) 50–98 mole perent.

Monomers of Table I (hereinafter referred to as component II), 2–30 mole percent.

Monomers of Table II (hereinafter referred to as component III), 0–20 mole percent.

The preferred vinyl halogeno-esters for component I are vinyl mono-di or tri-chloroacetates.

The preferred monomers for component II are ethyl acrylate, 2-ethylhexyl acrylate, vinyl isobutyl ether and ethylene.

The preferred monomers for component III are acrylamide, N-methylol acrylamide, itaconic acid, acrylic acid, vinyl alcohol, N-vinyl pyrrolidone and dimethylaminoethyl methacrylate.

The ratios of the three components are chosen to achieve a satisfactory balance between adhesion and coating quality. In general, adhesion to subsequently applied hydrophilic layers increases as the amount of component III is increased; however, the amount of component II must then also be increased to lower the softening point and avoid poor coating quality. The proportions of components II and III may be increased up to the limit where adhesion to the polyester support starts to weaken.

The composition of the copolymer for layer A preferably lies within the following limits, which are expressed in terms of the mole percent of each monomer constituent:

|  | Mole percent |
|---|---|
| Component I | 70–95 |
| Component II | 3–20 |
| Component III | 2–10 |

The synthetic linear polyester support is preferably polyethylene terephthalate. Polyethylene terephthalate, when so used, is invariably biaxially orientated and heat set to produce a stronger film base. The methods of manufacture of such film base with suitable mechanical properties for use as a support in various photographic film products are well known.

By full orientation is meant the process of simultaneous or sequential longitudinal and transverse stretching of the support, and crystallisation and heat setting of the support while held to prevent shrinking.

The vinyl halogeno-ester copolymers of layer A may be applied to the synthetic linear polyester film support either before or after it has been fully orientated either from aqueous dispersions or latices, or from organic solvent solutions. Application before full orientation may consist of applying the copolymer to the extruded amorphous support, to the uniaxially stretched support or to the biaxially stretched support but before the heat setting step.

It is generally preferred to apply the copolymers of the present invention from aqueous dispersions or latices. Thereby the use of costly organic solvents is avoided.

Further it is preferred to apply the copolymers to the polyester support before full orientation when the subsequent stretching and/or heat setting of the support ensures excellent adhesion of the copolymers to the support without the use of swelling agents for the polyester support. It is a feature of the copolymers, when so applied, that layer A withstands the stretching and heat treatment employed during full orientation without becoming discontinuous or producing visible haze. When applied before full orientation the aqueous dispersions and/or latices of the copolymers have further advantages over organic solvent solutions in that the possibility of excessive attack by organic solvents on the unorientated or partially orientated support, is avoided.

The copolymers of the present invention may be applied to the polyester support after it has been fully orientated, in which case to obtain the best possible adhesion of the polymer to the support, the fully orientated support is preferably treated with a swelling agent or is exposed to a corona discharge before the polymer is applied.

Treatment with a swelling agent may consist in coating the film with an aqueous or organic solvent solution or aqueous dispersion of the swelling agent and then heating the film for a short period of time to remove the solvents or dispersion medium and to allow the swelling agent to penetrate the surface of the support. Alternatively, the swelling agent may be included in the copolymer solution or dispersion. Suitable swelling agents are halophenols and a-chloro substituted aliphatic acids e.g. dichlorophenol, trichlorophenol, p-chloro-meta-cresol p-chlor-resorcinol and trichloracetic acid.

The fully orientated support may conveniently be exposed to a corona discharge by passing it between electrodes separated by 0.25–6.35 mm. carrying an alternating voltage of 5–40 kv. at 10–100 kc. s. The dwell time in the discharge may be up to 5 seconds.

It is to be understood that layer A may include constituents other than the copolymers defined above, such constituents being e.g. wetting agents, emulsifiers, colloid stabilisers, coalescing agents, plasticisers and polymeric plasticisers.

The dispersions, latices or solutions for layer A may also contain small amounts of cross linking agents, so that during drying by heating the layer becomes cross linked. The cross linking agent may be, for example, dimethylol urea when the copolymer contains amide groups, or hexa-methoxy methyl melamine when the copolymer contains free carboxyl or hydroxyl groups.

The aqueous solutions and dispersions may be applied to the film support by any of the known coating methods such as dip coating, bead coating, slot coating, air knife coating or gravure coating.

The applied wet layers are dried by air movement at an elevated temperature or by infrared radiation to give a clear coalesced coating of approximately 0.5–10 mgs. of polymer per dm. sq. To ensure good coalescence it is preferable that the dispersed particles of polymer have a diameter less than 5 microns.

A film assembly as hereinbefore defined will accept with good anchorage onto the surface of layer A a more hydrophilic layer B(i) such as a thin layer comprising gelatin which has been applied from an organic solvent or aqueous dispersion. The organic solvent or aqueous dispersion of gelatin may also contain synthetic polymers or resins, cross linking agents, surface active agents and adhesion promotors, for example, polyvinyl acetate, formaldehyde, sodium lauryl sulphate and resorcinol. There may be superimposed on this gelatin containing layer a light sensitive gelatino-silver halide emulsion to give a photographic film product showing excellent adhesion of the assembly of layers throughout all photographic processing steps.

The film assembly as hereinbefore defined will accept with good anchorage onto the surface of layer A a cellulose acetate B(ii) or cellulose acetate butyrate layer B(iii). These layers may afterwards be hydroylsed on their outer surface and impregnated with a light-sensitive diazonium salt, or may be directly impregnated with a light-sensitive diazonium salt contained in an attacking solvent medium, to produce a diazotype film material.

The film assembly as hereinbefore defined will accept with good anchorage onto the surface of layer A a layer of polyvinyl acetal B(iv) which may be directly impregnated by a light-sensitive diazonium salt, contained in an attacking solvent medium, to produce a diazotype film material.

Also the film assembly as hereinbefore defined will accept with good anchorage onto the surface of layer A a layer of polyvinyl acetate or partially hydrolysed polyvinyl acetate B(v) which includes a light-sensitive diazonium salt or which is subsequently impregnated with such a salt.

The film assembly of the present invention as hereinbefore defined is also of use in the production of matt lacquer coated polyester film material and according to this aspect of the present invention there is provided a translucent polyester film material which is receptive to clear and legible marking with pencil or ink, which comprises a synthetic linear polyester film base carrying on at least one surface a layer A of a copolymer of a vinyl halogeno ester as hereinbefore defined, the said layer having been applied to the polyester support base before orientation of the film base, between successive stages in the orientation of the film base, or after full orientation of the film base and an adherent layer B(vi) of an organic film-forming organic-solvent soluble material, containing finely divided discrete particles of an inorganic translucence producing toothing agent or agents.

Organic film forming materials for layer B(vi) may be selected from one or more of the following: a cellulose ester; an acrylic polymer or copolymers; an organic soluble urea-formaldehyde resin or modified urea-formaldehyde resin; and organic solvent soluble melamine-formaldehyde resin or modified melamine-formaldehyde resin; and alkyd resin; a polyvinyl acetal, a curable epoxy resin; a soluble polyamide resin.

These film forming materials may be used in admixture. For example, a lacquer grade cellulose nitrate may suitably be combined with proportions of a urea-formaldehyde or melamine formaldehyde resin, together with proportions of an alkyd resin to obtain a balance between flexibility, hardness and mar resistance; a curable epoxy resin may be suitably combined with proportions of an epoxy-reactive polyamide resin.

Finely divided inorganic translucene-producing toothing agents may, for example, be selected from silica, silicate, ground glass, chalk, talc, diatomaceous earth, magnesium carbonate, zinc oxide and titanium oxide. Finely divided silica of particle size 0.1 to 15 microns is the preferred toothing agent, together with which smaller quantities of the other materials may be incorporated, to obtain the required degree of translucency and to increase the toughness and mar resistance of the coating.

It is preferred that layer B(vi) should be baked for a short period at temperatures around 100 to 120° C. to effect cure of partially polymerised constituents.

The material content of layer B(vi) is not limited to those so far specified and minor proportions of other constituents may advantageously be added to effect cure and control flexibility of the coating, and to reduce pick-up of static electricity by the coated film.

The film assembly of the present invention is also of use in the production of a direct image or pre-sensitised lithographic printing plate and according to this aspect of the present invention there is provided a transulucent polyester film material which comprises a synthetic linear polyester base carrying on at least one surface layer A of a copolymer of a vinyl halogenoester as hereinbefore defined the said layer having been applied to the polyester support base before orientation of the film base, between successive stages in the orientation of the film base, or after full orientation of the film base, and an adherent layer B(vii) which comprises a water swellable organic film forming material which has been insolubilised and which contains at least one finely divided inorganic filler.

Suitable water swellable organic film forming materials for layer B(vii) are: Cellulose ethers, e.g. methyl cellulose, ethyl cellulose, hydroxymethyl cellulose, hydroxy, propylmethyl cellulose, carboxy methyl cellulose; polyacrylamides; polyvinyl pyrrolidone; sodium aliginate; natural gums such as gum arabic; polyvinyl alcohols; carbohydrates, e.g. starch and dextrin; proteins, e.g. casein and zein; vinyl/maleic anhydride copolymers; ethylene oxide polymers.

The preferred hydrophilic water swellable material is polyvinyl acetate which has been hydrolysed to an extent of 84–98%.

The materials may be insolubilised in some cases by the application of heat or by the inclusion of a suitable cross linking agent in the layer, examples of such cross linking agents are: urea formaldehyde; melamine formaldehyde; glyoxal and dialdehydes generally; formaldehyde and dibasic acids.

The preferred cross linking agent for polyvinyl alcohol is a methylated melamine-formaldehyde resin.

Suitable finely divided fillers for use in layer B(vii) are naturally occuring silicates, e.g. clay, kaolin, talc, bentonite, sepiolite and mica; oxides, e.g. titanium dioxide, zinc oxide, colloidal silica, diatomaceous silica; carbonates, e.g. calcium carbonate, magnesium carbonate, barium carbonate and sulphates, e.g. barium sulphate and calcium sulphate. The preferred fillers are silica, clay and titanium dioxide.

The translucent polyester film material carrying layer B(vii) as defined, may be used as a direct image liothographic by inscribing an image on the film using an oleophilic medium. Alternatively, the film may be provided with a coating of positive-or negative-working light sensitive material and may then be used as a pre-sensitised lithographic printing plate.

Another particular use of the copolymers of the present invention is as the intermediate layer in the assembly described in B.P. 1,080,817. In this specification it states that the intermediate layer may be a copolymer of a vinyl halogeno-ester, the copolymers of vinyl halogeno esters of the present invention have been found to be of use as such intermediate layers.

The following examples will serve to illustrate the invention:

The film base products of Examples 1-19 were further coated with a photographic gelatin silver halide emulsion applied directly to the gelatin tops coating. The layers of these fully coated photographic films were strongly adherent to one another and to the film support so that the fully coated film could be processed without danger of separation of the layers or frilling.

Samples of polyethylene terephthalate film from these Examples 1 to 19 were further examined for the quality of the coatings. The vinyl halogeno ester copolymer coatings were stained with Rhodamine BNS dye and visually inspected. Electron photomicrographs were taken of the surfaces of the coatings. The light transmission of the polyester supports bearing copolymer coatings was measured. In all cases it was established that the coatings were satisfactorily uniform, free from discontinuities and optically clear.

In the examples use is made of such commercial raw materials which have been identified by their Trade names.

They are as follows:

| Name | Character | Manufacturer |
| --- | --- | --- |
| Pluronic F68 | Ethylene oxide-propylene oxide condensates. | Jacobson Van der Berg Ltd. |
| Ethomeen T12 | Ethylene oxide-olephilic amine condensate. | Armour Hess Ltd. |
| Humifen WS 25 | Sulphonated olephilic polyester. | Generzl Aniline & Film Copn. |
| Texofor FN8 | Condensate of nonyl-phenyl with 8 mols ethylene oxide. | Glovers (Chemicals) Ltd. |
| Triton X301 | Sodium salt of alkyl aryl polyether sulphate. | Rohm & Haas Ltd. |
| Lissocamine A | Cationic surfactant | Imperial Chemical Industries Ltd. |
| Formvar 1595E | Copolyvinyl formal containing 9.5 to 13% polyvinyl acetate and 5-6% polyvinylalcohol. | Shawinigan Ltd. |
| Aerosil TK 800 | Amorphous silica | Degussa. |
| Gasil 64 | Micronised silica, 6-14 microns diameter. | Joseph Crossfield & Sons Ltd. |
| Tioxide R CR 3 | Modified titanium | British Titon Products Co. Ltd. |

EXAMPLE 1

A glass flask containing 3000 ml. of stirred de-oxygenated water at 40° C. was prepared and fitted with a slow stream of nitrogen. Thirty percent of a solution of ferrous ammonium sulphate (0.24 g. in 120 ml. water) and five percent of a solution of Pluronic F68 (Jacobson Van den Berg. Ltd., 45.6 g.) and acrylamide (50 g.) these dissolved together in 160 ml. water were added. Five percent of a pre-prepared mixture of vinyl chloracetate (940 g.) and ethyl acrylate (150 g.) was then added.

On continual stirring at 40° C. in a nitrogen atmosphere ten percent of a solution of ammonium persulphate (1.71 g. in 200 ml. water) followed by ten percent of a solution of sodium metabisulphite (0.25 g. in 200 ml. water) were added to initiate the polymerisation during the following 15 minutes.

Continual heating and stirring was carried out for a further 165 minutes at 40° C. while the remaining monomer mixture and aqueous solutions were progressively added. The surfactant with acrylamide was maintained in addition slightly ahead of the vinyl chloracetate-ethyl acrylate mixture followed by the persulphate and bisulphite additions.

The latex was stirred for a further 30 minutes at 40° C. after all additions. On cooling, the latex was adjusted to pH 5 with dilute ammonia. Conversion was 98% to give a stable latex of mean particle size 0.1 micron diameter.

The following coats were applied to polyethylene terephthalate film. The first coat was applied to uniaxially, i.e. lengthways stretched film and was a latex obtained as above and having the following compositions:

Coat I

|  | G. |
| --- | --- |
| A terpolymer comprising 78 mole percent vinyl monochloracetate, 15 mole percent ethyl acrylate and 7 mole percent acrylamide | 20.0 |
| Pluronic F68 | 0.8 |
| Water | 100 |

After drying, the coat weight was aproximately 6 mgm./dm. sq. The coated film was stretched sideways by a factor of 3 at 110° C. and heat set at 180° C.

Coat II

|  | G. |
| --- | --- |
| Gelatin | 3.0 |
| Formalin (40% formaldehyde) | 0.08 |
| Water | 100 |

The coat was dried and heated for 5 minutes at 110° C.

The same latex was also applied to biaxially orientated film but before heat setting at 180° C. The gelatin coat was than applied and dried.

EXAMPLE 2

Fully orientated polyethylene terephthalate film was exposed to a corona discharge of 30 watts per electrode inch with a 1 mm. gap between the electrodes.

A latex with a composition as given in Example 1 was then applied and dried to give a coat weight of 1.5 mgm./dm. sq. A second coat with a composition as given in Example 1 was then applied and dried and heated for 3 minutes at 110° C.

EXAMPLE 3

Fully orientated terephthalate film was coated with the following solution:

|  | G. |
| --- | --- |
| 4-chloro resorcinol | 3.0 |
| Ethomeen T12 | 0.025 |
| Water | 100 |

The polymer latex and aqueous gelatin coats were then applied as in Example 2.

EXAMPLE 4

Fully orientated polyethylene terephthalate film was exposed to a corona discharge as in Example 2 and the following coats were applied:

Coat I

|  | G. |
| --- | --- |
| A terpolymer of 78 mole percent vinyl monochloracetate, 12 mole percent ethyl acrylate and 10 mole percent acrylamide | 20 |
| Pluronic F68 | 0.8 |
| Water | 100 |

The coat was dried at 100° C.

Coat II

|  | G. |
| --- | --- |
| Gelatin | 3.0 |
| Water | 100 |

The coat was dried and heated for five minutes at 110° C.

The latex of Coat I was prepared analogously to that described in Example 1.

EXAMPLE 5

A first coat was applied to uniaxially stretched polyethylene terephthalate film and was a latex with the following composition:

Coat I

|  | G. |
| --- | --- |
| A copolymer of 95 mole percent vinyl monochloracetate and 5 mole percent ethyl acrylate | 20.0 |
| Pluronic F68 | 0.8 |
| Water | 100 |

The coat was dried and the coated film fully orientated as in Example 1.

Coat II

An organic solvent dispersion of gelatin as follows:

| | |
|---|---|
| Gelatin | g.. 1.4 |
| Polyvinyl acetate | g.. 0.1 |
| Water | mls.. 5.0 |
| Acetic acid | ml.. 1.0 |
| Methanol | mls.. 94 |
| Formalin (40% formaldehyde) | ml.. 0.1 |

The coat was dried and heated for 5 minutes at 110° C.

The latex of Coat I was prepared analogously to that described in Example 1.

EXAMPLE 6

A first coat was applied to uniaxially stretched polyethylene terephthalate film and was a latex with the following composition:

Coat I

| | G. |
|---|---|
| A terploymer of 55 mole percent vinyl monochloracetate, 25 mole percent ethyl acrylate and 20 mole percent acrylamide | 20 |
| Humifen WS25 | 0.4 |
| Water | 100 |

The wet coat weight was 30 mgm./dm. sq. and after drying the coated film was orientated as in Example 1.

Coat II

A gelatin solution with the same composition as Coat II in Example 1 was applied.

The latex of Coat I was prepared analogously to that described in Example 1.

EXAMPLE 7

The first coat was applied to uniaxially stretched polyethylene terephthalate film and was a latex with the following composition:

Coat I

| | G. |
|---|---|
| A terpolymer of 65 mole percent vinyl monochloracetate, 30 mole percent 2-ethyl hexyl acrylate and 5 mole percent N-methylol acrylamide | 20.0 |
| Pluronic F68 | 0.4 |
| Water | 100 |

The coat was dried to give approximately 6 mgn./dm. sq. of polymer and the coated film was orientated as in Example 1.

Coat II

| | G. |
|---|---|
| Gelatin | 3.0 |
| Formalin (40% formaldehyde) | 0.08 |
| Water | 100 |
| Sodium lauryl sulphate | 0.03 |

The film was dried and heated for three minutes at 110° C.

The latex of Coat I was prepared analogously to that of Example 1.

EXAMPLE 8

The first coat was applied to uniaxially stretched polyethylene terephthalate film and was a latex with the follow composition:

Coat I

| | G. |
|---|---|
| A terpolymer of 85 mole percent vinyl monochloracetate, 10 mole percent of ethyl acrylate and 5 mole percent acrylic acid | 20.0 |
| Pluronic F68 | 0.8 |
| Water | 100 |

The coat was dried and the coated film was orientated as in Example 1.

Coat II

An aqueous gelatin solution with the same composition as Coat II in Example 1.

The film was dried and heated for five minutes at 110° C.

The latex of Coat I was prepared analogously to that of Example 1.

EXAMPLE 9

The first coat was applied to uniaxially stretched polyethylene terephthalate film and was a latex with the following composition:

Coat I

| | G. |
|---|---|
| A terpolymer of 60 mole percent vinyl monochloracetate, 20 mole percent ethyl acrylate and 20 mole percent dimethyl aminoethyl methacrylate | 10.0 |
| Pluronic F68 | 0.4 |
| Water | 100 |

The film was dried and fully orientated and an aqueous gelatin solution applied as in Example 1.

The latex of Coat I was prepared analogously to that of Example 1.

EXAMPLE 10

Fully orientated polyethylene terephthalate film was coated with the following dispersion:

Coat I

| | G. |
|---|---|
| p-Chloro-m-cresol | 5.0 |
| Humifen WS25 | 1.0 |
| Water | 100 |

The coat was heated for 2 minutes at 100° C.
The following coats were then applied:

Coat II

| | G. |
|---|---|
| A terpolymer comprising 80 mole percent vinyl monochloracetate, 10 mole percent ethyl acrylate and 10 mole percent N-vinyl pyrrolidone | 10.0 |
| Gelatin | 1.0 |
| Texofor FN8 | 0.4 |
| Water | 100 |

The coat was dried at 100° C.

Coat III

| | G. |
|---|---|
| Gelatin | 3.0 |
| Resorcinol | 3.0 |
| Water | 100 |

The coat was dried and heated for five minutes at 110° C.

EXAMPLE 11

Fully orientated polyethylene terephthalate film was coated with the following solution:

Coat I

| | G. |
|---|---|
| 4-chloro-resorcinol | 3.0 |
| Sodium lauryl sulphate | 0.01 |
| Water | 100 |

After drying for five minutes at 100° C., the following coats were applied:

Coat II

A latex as follows:

| | G. |
|---|---|
| A terpolymer from 70 mole percent vinyl monochloracetate, 25 mole percent ethyl acrylate and 5 mole percent monoethyl itaconate | 20.0 |
| Texofor FN8 | 0.4 |
| Water | 100 |

The coat was dried for one minute at 110° C.

Coat III

A gelatin solution with the same composition as Coat II in Example 1.

The coated film was heated for three minutes at 110° C.

EXAMPLE 12

The first coat was applied to uniaxially stretched polyethylene terephthalate film and was a latex with the following composition:

Coat I

|  | G. |
|---|---|
| A terpolymer from 90 mole percent vinyl monochloroacetate, 8 mole percent n-butyl acrylate and 2 mole percent methacrylamide | 10.0 |
| Texofor FN8 | 0.4 |
| Water | 100 |

The coat was dried and the coated film fully orientated as in Example 1.

Coat II

An organic solvent dispersion of gelatin with a composition as given in Example 5 was applied.

The coating was dried and heated for five minutes at 110° C.

EXAMPLE 13

60 mgm./dm. sq. of a polymer latex was applied to uniaxially stretched polyethylene terephthalate film. The composition of the latex was as follows:

| A terpolymer comprising 85 mole percent vinyl monochloracetate, 10 mole percent ethyl acrylate and 5 mole percent vinyl isobutyl ether | g. | 10.0 |
|---|---|---|
| Texofor FN8 | g. | 0.4 |
| Water | mls. | 100 |

The film was dried and fully orientated before a gelatin coat was applied as in Example 1.

EXAMPLE 14

A vinyl acetate-ethylene copolymer latex (Mowilith DM10, Hoechst Chemicals Ltd.; 1500 g.) was diluted with water (1125 ml.) and heated with stirring to 95–100° C. A solution of potassium hydroxide (697 g.) in water (1500 ml.) was added during one hour with continual stirring for a further 5 hours at 95–100° C. The precipitated product was removed by filtration, washed and vacuum dried (360 g.). The vinyl alcohol-ethylene copolymer product (360 g.) was added to molten chloracetic acid (1440 g.) at 95° C. when continual heating and stirring was carried out for 5 hours. After cooling to 50° C., acetone (1000 ml.) was added and the solution poured into water (20 litres). The precipitated polymer was repeatedly dissolved in acetone and reprecipitated into water until free from acid. By consideration of the composition of the starting material and by analysis, the polymer was found to have the composition vinyl chloracetate (50 mole percent)-ethylene (30 mole percent)-vinyl alcohol (20 mole percent).

The copolymer (40 g.) dissolved in methylene chloride (120 ml.) was mixed with a solution of the surfactant Triton X301 (Rohm and Haas, 1.0 g.) in water (250 ml.) and passed through an ultrasonic homogeniser. After removal of methylene chloride by passing air through the dispersion held at 40° C. the copolymer was prepared for use in a stable condition.

The vinyl alcohol-ethylene copolymer product obtained by hydrolysis of the vinyl acetate-ethylene copolymer as described above was heated with six times its weight of monobromoacetic acid for 24 hours at 100° C. The product isolated by pouring into water, filtration and drying, had composition vinyl bromoacetate (60 mole percent)-ethylene (30 mole percent)-vinyl alcohol (10 mole percent).

Fully orientated polyethylene terephthalate film was exposed to a corona discharge as in Example 2 and the following coats were then applied:

Coat I

|  | G. |
|---|---|
| Terpolymer comprising 60 mole percent vinylmonobromoacetate, 30 mole percent ethylene and 10 mole percent vinyl alcohol (prepared as above) | 2.0 |
| Acetone | 100 |
| Hexa-methoxy methyl melamine | 0.1 |
| p-Toluene sulphonic acid | 0.01 |

The coat was dried for one minute at 100° C. and a gelatin dispersion with a composition as given for coat II in Example 4 was applied and dried.

EXAMPLE 15

Fully orientated polyethylene terephthalate film was coated with an aqueous solution as follows:

Coat I

|  | G. |
|---|---|
| 4-chlororesorcinol | 3.0 |
| Ethomeen T12 | 0.025 |
| Water | 100 |

The following dispersion was then applied:

Coat II

|  | G. |
|---|---|
| A terpolymer comprising 60 mole percent vinyl monochloropropionate, 30 mole percent ethylene and 10 mole percent vinyl alcohol | 20.0 |
| Triton X301 | 0.5 |
| Hexa-methoxy methyl melamine | 0.5 |
| p-Toluene sulphonic acid | 0.1 |
| Water | 100 |

The coat was dried and a gelatin coat with the composition as given in Coat II Example 1 was applied, dried and heated for three minutes at 110° C.

EXAMPLE 16

The vinyl alcohol-ethylene copolymer product as described in Example 14 was heated with six times its weight of dichloracetic acid for 6 hours at 90° C.

On isolation a copolymer of composition vinyl dichloracetate (55 mole percent)-ethylene (30 mole percent)-vinyl alcohol (15 mole percent) was obtained.

Fully orientated polyethylene terephthalate film was exposed to a corona discharge as in Example 2. The following coat was then applied:

|  | G. |
|---|---|
| A terpolymer comprising 55 mole percent vinyl dichloroacetate, 30 mole percent ethylene and 15 mole percent vinyl alcohol (prepared as above) | 20.0 |
| Benzyl alcohol | 20 |
| Triton X301 | 0.8 |
| Water | 100 |

The coat was dried for two minutes at 100° C. and a gelatin coat with the composition as given in Coat II Example 1 was applied, and heated for five minutes at 110° C.

EXAMPLE 17

Fully orientated polyethylene terephthalate was exposed to a corona discharge as in Example 2 and the following coats were applied:

Coat I

|  | G. |
|---|---|
| A terpolymer from 85 mole percent vinyl monochloracetate, 10 mole percent ethyl acrylate and 5 mole percent acrylamide | 20.0 |
| Pluronic F68 | 0.4 |
| Lissolamine | 0.4 |
| Water | 100 |

The coat was dried for two minutes at 105° C.

Coat II

A gelatin solution with the same composition as Coat II, Example 1.

The coated film was dried for five minutes at 105° C.

The latex of Coat I was prepared analogously to that of Example 1.

EXAMPLE 18

Vinyl chloroacetate - vinyl versatate - 2 - hydroxyethyl methacrylate were employed in molar ratios 70:25:5 and were copolymerised in methyl ethyl ketone solution at reflux for 12 hours using 0.5 of azobis-isobutyronitrile based on monomers as free-radical generating agent.

Fully orientated polyethylene terephthalate film was coated with an aqueous solution of 4-chlororesorcinol as in Example 3. The following coats were then applied:

Coat II

|  | G. |
|---|---|
| A terpolymer from 70 mole percent vinyl monochloracetate, 25 mole percent vinyl versatate and 5 mole percent 2-hydroxyethyl methacrylate, prepared as above | 2.0 |
| Methyl ethyl ketone | 100 |
| Hexa-methoxymethyl melamine | 0.1 |
| p-Toluene sulphonic acid | 0.01 |

The coating was dried for one minute at 100° C.

Coat III

Composition as for Coat II in Example 5.

After drying the coat was heated for five minutes at 110° C.

EXAMPLE 19

Fully orientated polyethylene terephthalate film was coated with an aqueous dispersion of p-chloro-m-cresol as in Example 10. The following coats were then applied:

Coat II

|  | G. |
|---|---|
| A terpolymer from 85 mole percent vinyl monochloracetate, 10 mole percent ethyl acrylate and 5 mole percent N-(1,1-dimethyl-3-oxobutyl) Acrylamide | 2.0 |
| Methyl ethyl ketone | 100 |

The coat was dried for one minute at 100° C.

Coat III

A gelatin coat composition as for Coat II in Example 5.
The film was heated for 5 minutes at 110° C.
The terpolymer of Coat II was prepared analogously to the terpolymer of Example 1.

EXAMPLE 20

A latex containing a terpolymer from 80 mole percent vinyl monochloroacetate, 10 mole percent ethyl acrylate and 10 mole percent acrylamide was applied to uniaxially stretched polyethylene terephthalate film.

The coating was dried and gave a clear, uniform layer with a coat weight of 9 mg./dm.² The coated film was then fully orientated as in Example 1.

A similar latex but containing a copolymer from 89 mole percent vinyl monochloroacetate and 11 mole percent acrylamide, i.e. with no ethyl acrylate, was also applied to uniaxially stretched polyethylene terephthalate film. In this case the coat was hazy after drying and the haze increased in intensity when the film was fully orientated.

The following measurements of light transmission of the two coated films of this example show the improvement in clarity obtained by the incorporation of ethyl acrylate in the polymer.

| Coat | Percent light transmission | |
|---|---|---|
|  | Uniaxially stretched film | Biaxially stretched film |
| Vinyl monochloracetate-ethyl acrylate-acrylamide terpolymer | 95 | 99 |
| Vinyl monochloracetate-acrylamide copolymer | 86 | 70 |

The following Examples 21 to 24 illustrate the usefulness of the products of this invention in the manufacture of film for diazo sensitsation, drafting purposes and litho plates.

EXAMPLE 21

Fully orientated polyethylene terephthalate film bearing an adherent layer of 78 mole percent vinyl monochloracetate, 15 mole percent ethyl acrylate and 7 mole percent acrylamide prepared as in Example 3 was further coated with the following composition:

|  | G. |
|---|---|
| Formvar 1595E | 6.4 |
| Aerosil TK800 (amorphous silica) | 1.2 |
| Gasil 64 | 1.1 |
| Tioxide RCR3 (titanium oxide) | 0.12 |
| Butanol | 10.3 |
| Ethyl lactate | 6.4 |
| Tricholorethylene | 74.5 |

The coating was dried for 10 minutes at 105° C. to give a coat approximately 10 microns thick.

This layer was impregnated with light sensitive diazonium salts together with coupling and stabilising compounds dissolved in a mixture of ethanol and acetone to produce a light sensitive diazo-type film. The layers remained strongly adherent one to another and to the film base throughout all stages of preparatiton and use of the product.

EXAMPLE 22

Fully orientated polyethylene terephthalate film bearing an adherent layer of 78 mole percent vinyl monochloracetate, 15 mol percent ethyl acrylate and 7 mole percent acrylamide prepared as in Example 2 was further coated with the following composition:

|  | G. |
|---|---|
| Cellulose acetate | 9.0 |
| Acetone | 83.0 |
| Diacetone alcohol | 8.0 |

The layer was dried for 15 minutes at 110° C. The dry coat was approximately 8–10 microns thick and it was hydrolised to a depth of 4–5 microns and then impregnated with an aqueous solution of light sensitive diazonium compounds to produce a light sensitive diazo-type film. The layers adhered strongly one to another and to the film base throughout the hydrolysis and subsequent processes.

EXAMPLE 23

Fully orientated polyethylene terephthalate film bearing an adherent layer of a terpolymer from 78 mole percent vinyl monochloracetate, 15 mole percent ethyl acrylate and 7 mole percent acrylamide made as in Example 1 was further coated with a lacquer of composition as follows:

|  | G. |
|---|---|
| Formvar 1595E | 8.9 |
| Aerosil TK800 | 1.6 |
| Gasil 64 (a micronised silica) | 1.4 |
| Tioxide RCR3 (a modified titanium oxide) | 0.15 |
| Ethyl lactate | 6.0 |
| Butanol | 10.0 |
| Trichloroethylene | 71.5 |

The coating was dried and heated for 15 minutes at 110° C. to give a layer approximately 5–6 microns thick.

The coating adhered strongly to the base and the drafting properties were excellent.

EXAMPLE 24

A product suitable for use as a drafting film was prepared as in the previous example except that the lacquer applied had the following composition:

|  | G. |
|---|---|
| Cellulose nitrate | 4.5 |
| Phenol formaldehyde resin | 8.7 |
| Castor-oil-modified alkyd resin | 4.5 |
| Gasil 64 | 3.1 |
| Rutile titanium oxide | 0.2 |
| Industrial methylated spirits | 8.0 |
| Methyl ethyl ketone | 40.0 |
| Methyl Cellosolve | 22.0 |
| Xylene | 9.0 |

The coating was dried and cured for 15 minutes at 105° C. and had excellent adhesion to the base.

EXAMPLE 25

Fully orientated polyethylene terephthalate film bearing an adherent layer of 78 mole percent vinyl monochloracetate, 15 mole percent ethyl acrylate and 7 mole percent acrylamide as made in Example 3 was further coated with a lacquer of the following composition:

| | |
|---|---|
| 97.7—98.4 mole percent hydrolysed polyvinyl acetate | g— 8.0 |
| China clay | g— 38.0 |
| Tioxide RCR3 | g— 25.0 |
| Aerosil TK800 | g— 19.0 |
| Methylated melamine formaldehyde precondensate | g— 10.0 |
| Magnesium chloride hexahydrate | g— 1.8 |
| Methanol | mls— 130 |
| Water | mls— 170 |

Hydrochloric acid was added to adjust the pH to 4–5.

The coating was dried and heated for 20 minutes at 110° C. and the coat weight was approximately 60 mgs. per dm. sq.

The surface of the coated film accepted a typed image and 100 copies were made using an off-set printing process without any deterioration of adhesion of the lacquer to the polyester base.

The coated film was also sensitised by applying a solution of a diazonium diphenylamine/formaldehyde resin and dried to give a pre-sensitised litho plate. Adhesion to base was good throughout sensitisation, image development and subsequent off-set litho printing operations.

What is claimed is:

1. A film assembly which comprises synthetic linear polyester film base carrying on at least one surface a layer of a copolymer of a vinyl halogeno ester of a lower fatty acid with at least one other monomer copolymerizable therewith, the said ester and at least one said other monomer being selected so that the final copolymer has a softening point lower than that of the product obtained by homopolymerization of said ester in the absence of the said selecter monomer, the selected monomer being one whose homopolymer has a softening point of less than 0° C.

2. A film assembly according to claim 1 wherein the said vinyl halogeno ester is a vinyl chloroacetate.

3. A film assembly according to claim 1 wherein the said vinyl halogeno ester is a vinyl monochloroacetate.

4. A film assembly according to claim 1 wherein the selected monomer is selected from the class consisting of alkyl acrylates, alkyl methacrylates, polyalkylene oxide itaconates and maleates, vinyl alkyl ether, vinyl esters, alkenes, alkadienes and alkyl styrenes.

5. A film assembly according to claim 1 wherein the selected monomer is selected from the class consisting of ethyl acrylate, 2-ethyl-hexyl acrylate, vinyl isobutyl ether and ethylene.

6. A film assembly according to claim 1 wherein the copolymer is a copolymer of a vinyl halogeno ester of a lower fatty acid as defined and includes at least one further monomer which yields in the final copolymer a grouping selected from the class consisting of carboxyl, hydroxyl, ester, nitrile, amide, N-amino or N,N-di-substituted amide, amino and substituted amino groupings.

7. A film assembly according to claim 6 wherein the said further monomer is selected from the class consisting of acrylamide, N-methylol acrylamide, itaconic acid, acrylic acid, vinyl alcohol, N-vinyl pyrrolidone and dimethylamino-ethyl methacrylate.

8. A film assembly according to claim 6 wherein the said copolymer comprises 50–98 mole percent of vinyl halogeno ester of a lower fatty acid, 2 to 30 mole percent of said selected monomer and zero to 20 mole percent of said further monomer.

9. A film assembly according to claim 8 wherein the said copolymer comprises 70–95 mole percent of vinyl halogeno ester, 2–30 mole percent of said selected monomer and 2 to 10 mole percent of said further monomer.

10. A film assembly according to claim 1 wherein the said film base is biaxially orientated.

11. A film assembly according to claim 1 wherein the said copolymer layer has, superimposed thereon, a further layer of a film-forming material.

12. A film assembly according to claim 11 wherein the said layer is a layer containing gelatin.

13. A film assembly according to claim 11 wherein said further layer is a layer of a cellulose derivative selected from the class consisting of a cellulose acetate and cellulose acetate butyrate.

14. A film assembly according to claim 11 wherein said further layer is a layer of polyvinyl acetal.

15. A film assembly according to claim 11 wherein said further layer is a layer of a polymer selected from the class consisting of polyvinyl acetate and partially hydrolysed polyvinyl acetate.

16. A film assembly according to claim 11 and suitable for use as drafting film wherein the said further layer is a layer of an organic film-forming organic solvent-soluble material containing finely divided discrete particles of at least one inorganic translucence producing agent.

17. A film assembly according to claim 11 and suitable for use as a lithographic printing plate wherein said further layer is a layer of a water-swellable organic film-forming material which has been insolubilised and containing at least one finely divided inorganic filler.

18. A film assembly according to claim 17 wherein the said material is polyvinyl acetate hydrolysed to the extent of 84–98%.

19. A film assembly according to claim 17 wherein the said layer contains a cross-linking agent for the organic film-forming material.

20. A process for the production of a film assembly which comprises synthetic linear polyester film base carrying on at least one surface layer, a layer of a copolymer of a vinyl halogeno ester of a lower fatty acid with at least one other olefinically unsaturated monomer copolymerisable therewith, the said ester and at least one of said monomers being selected so that the final copolymer has a softening point lower than that of the product obtained by polymerisation in the absence of the said selected monomer, the selected monomer being one whose homopolymer has a softening point of less than 0° C., characterized in that the said film base is orientated and the layer is applied to the film base before or after full orientation of the film base.

21. A process according to claim 20 wherein the layer is applied to the fully orientated film base and the film base is subjected to treatment with a swelling agent, before the said layer is applied.

22. A process according to claim 20 wherein the layer is applied to the fully orientated film base and the film base is exposed to corona discharge before the said layer is applied.

23. A process according to claim 20 wherein the layer is applied from an aqueous dispersion of the said copolymer.

24. A process according to claim 21 wherein the layer is applied from a liquid media containing the said copolymer, said liquid medium containing a said swelling agent.

25. A process according to claim 21 wherein the said swelling agent is selected from the class consisting of halophenols and α-chloro-substituted aliphatic acids.

References Cited

UNITED STATES PATENTS

| | | | |
|---|---|---|---|
| 2,627,088 | 2/1953 | Alles et al. | 96—75 X |
| 2,943,937 | 7/1960 | Nadeau et al. | 96—87 |
| 2,984,569 | 5/1961 | Huys et al. | 96—87 |
| 3,201,249 | 8/1965 | Pierce et al. | 96—84 |
| 3,460,982 | 8/1969 | Appelbaum | 96—87 X |
| 3,447,947 | 6/1969 | Abbott et al. | 117—138.8 |

FOREIGN PATENTS

| | | | |
|---|---|---|---|
| 1,361,782 | 4/1964 | France | 96—87 |
| 1,166,616 | 3/1964 | Germany | 96—87 |

RONALD H. SMITH, Primary Examiner

U.S. Cl. X.R.

96—87 R, 75; 117—73, 76 F, 138.8 F, 138.8 B, 161 UC